(12) United States Patent
Nishimae et al.

(10) Patent No.: US 7,336,690 B2
(45) Date of Patent: Feb. 26, 2008

(54) SOLID-STATE LASER SYSTEM

(75) Inventors: Junichi Nishimae, Tokyo (JP); Tetsuo Kojima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 212 days.

(21) Appl. No.: 11/090,174

(22) Filed: Mar. 28, 2005

(65) Prior Publication Data

US 2005/0232328 A1    Oct. 20, 2005

(30) Foreign Application Priority Data

Mar. 30, 2004    (JP)    ............. 2004-098714

(51) Int. Cl.
*H01S 3/08*    (2006.01)
(52) U.S. Cl. ............... 372/98; 372/39; 372/50.23; 372/68; 372/92; 372/101
(58) Field of Classification Search ............ 372/69–72, 372/99, 101
See application file for complete search history.

(56) References Cited

U.S. PATENT DOCUMENTS

| | | | | |
|---|---|---|---|---|
| 3,588,508 A * | 6/1971 | Wieder | ............ | 250/330 |
| 3,934,210 A * | 1/1976 | Yarborough et al. | ......... | 372/105 |
| 4,493,086 A * | 1/1985 | Jain et al. | ............ | 372/21 |
| 5,164,947 A | 11/1992 | Lukas et al. | | |
| 5,359,616 A | 10/1994 | Yasui et al. | | |
| 5,684,820 A | 11/1997 | Jenkins et al. | | |
| 5,687,186 A * | 11/1997 | Stultz | ............ | 372/92 |
| 5,757,842 A * | 5/1998 | LaPlante et al. | ............ | 372/98 |
| 5,841,798 A * | 11/1998 | Chen et al. | ............ | 372/11 |
| 5,892,789 A | 4/1999 | Yasui et al. | | |
| 5,905,749 A | 5/1999 | Iwashiro et al. | | |
| 6,853,670 B2 | 2/2005 | Yanagisawa et al. | | |
| 6,870,862 B2 * | 3/2005 | Momiuchi et al. | ............ | 372/22 |
| 6,931,047 B2 * | 8/2005 | Kan et al. | ............ | 372/69 |
| 2001/0028672 A1 | 10/2001 | Yanagisawa et al. | | |
| 2005/0201442 A1 * | 9/2005 | Luo et al. | ............ | 372/69 |
| 2005/0276300 A1 * | 12/2005 | Ishizu | ............ | 372/70 |

FOREIGN PATENT DOCUMENTS

DE    42 05 587 A1    2/1992

(Continued)

OTHER PUBLICATIONS

Dr. Walter Koechner, "Solid-State Laser Engineering" Fourth Edition, pp. 195-211, Springer-Verlag, Berlin Heidelberg 1996.

*Primary Examiner*—Minsun Oh Harvey
*Assistant Examiner*—Yuanda Zhang
(74) *Attorney, Agent, or Firm*—Oblon, Spivak, McClelland, Maier & Neustadt, P.C.

(57) ABSTRACT

A simple and high-reliability constitution provides a solid-state laser system that allows a high-output, long-pulse-width laser beam to be obtained.

A solid-state laser system that includes a solid-state laser medium 1, a light source 2 for pumping the solid-state laser medium 1, two reflecting mirrors 3 and 4 for flanking the solid-state laser medium 1, thereby constituting a laser resonator, is constituted in such a manner that a virtual-mirror plane 5 is defined in the space between the solid-state laser medium 1 and the reflecting mirror 4; a lens 6 is provided between the virtual-mirror plane 5 and the reflecting mirror 4; and, by means of the forward and backward paths along the route from the virtual-mirror plane to the reflecting mirror by way of the lens, the virtual-mirror plane in the forward path and the virtual-mirror plane in the backward path are made in an optically conjugated relationship with each other.

8 Claims, 8 Drawing Sheets

FOREIGN PATENT DOCUMENTS

| | | |
|---|---|---|
| DE | 43 45 434 C2 | 9/1993 |
| DE | 195 43 586 A1 | 11/1995 |
| DE | 196 44 315 A1 | 10/1996 |
| JP | 6-152018 | 5/1994 |
| JP | 6-302902 | 10/1994 |
| JP | 7-235714 | 9/1995 |
| JP | 8-250797 | 9/1996 |
| JP | 9-500494 | 1/1997 |
| JP | 2000-340868 | 12/2000 |
| JP | 2001-007421 | 1/2001 |
| JP | 2001-274491 | 10/2001 |
| WO | WO 94/27346 | 11/1994 |

* cited by examiner (a)

(b)

PRIOR ART

— Output of Long-Length Resonator
— Beam Diameter of Long-Length Resonator
- - - Output of Short-Length Resonator
------ Beam Diameter of Short-Length Resonator

PRIOR ART (b)

— Long-Length Resonator
- - - Short-Length Resonator

PRIOR ART (a)

—— Laser Output
— — — Pulse Width (b)

—— Laser Output
— — — Pulse Width (a)

(b)

PRIOR ART

SOLID-STATE LASER SYSTEM

BACKGROUND OF THE INVENTION

1. Field of the Invention

The present invention relates to solid-state laser systems, and particularly to pulse-type solid-state laser systems that output high-power laser beams with relatively long pulse widths.

2. Description of the Related Art

A conventional solid-state laser system includes a solid-state laser medium, a light source for pumping the solid-state laser medium, and a laser resonator constituted from at least two reflecting mirrors arranged so as to flank the solid-state laser medium. The solid-state laser medium is pumped by the light source, thereby generating gain; a ray shuttling between the reflecting mirrors is amplified by means of the gain of the laser medium; and rays that are transmitted through a partial-reflection mirror, out of the reflecting mirrors, having partial-reflection characteristics in which part of rays are reflected and the rest are transmitted, are extracted as an output. The constitution in which planar mirrors are utilized as reflecting mirrors and a solid-state laser medium is situated at the center of the reflecting mirrors is a fundamental unit in cases where a solid-state laser system is made to output high power, without additional methods of adjusting a laser beam, by connecting the solid-state laser media in series, and the constitution is one of the most fundamental and useful ones.

In general, in a solid-state laser system, a solid-state laser medium generates heat after being pumped, thereby producing a temperature distribution; and whereupon a thermal-lens effect occurs in which the solid-state laser medium functions as a lens. The thermal-lens effect is enhanced approximately in proportion to a pumping input; the thermal-lens effect, enhanced in response to the pumping input, of the solid-state laser medium could produce a phenomenon in which the operation of the resonator becomes out of the conditions for stable oscillation, thereby ceasing the oscillation. The upper limit, of the strength of the thermal-lens effect, under which the resonator stably operates, is related to the length of the resonator; the shorter the length of the resonator is, the more stably it operates even with a strong thermal-lens effect. In other words, the resonator stably operates up to a high pumping input and a high output. Therefore, in order to obtain a high output, it is necessary to utilize a short-length resonator and to pump it strongly.

Meanwhile, in the case of a pulse-type laser system that performs pulse oscillation by means of an optical switch, there is a relationship that the shorter the length of the resonator is and the stronger the pumping is, the shorter the pulse width is.

As described above, in general, the high output and the relatively long pulse width in pulse oscillation require contradictory operating conditions.

With regard to a pulse-type solid-state laser system that generates a long-pulse-width laser beam by using a long length resonator, a resonator structure for enhancing the stability of the resonator has been proposed (e.g., refer to Patent reference 1). The resonator includes a solid-state laser medium; a first telescope for magnifying a laser ray entering from the one end thereof, i.e., a laser ray coming from the solid-state laser medium and for contracting the laser ray that has been reflected by a first planar reflecting mirror and enters thereto from the other end thereof, the first planar reflecting mirror for reflecting the laser ray that comes from the first telescope; a second telescope for magnifying the laser ray that has been reflected by the first planar reflecting mirror, contracted by the first telescope, amplified by the laser medium, and then enters thereto from the one end and for contracting the laser ray that enters thereto from the other end thereof, and a second planar reflecting mirror for reflecting the laser ray that enters thereto by way of the second telescope. The foregoing telescope is generally constituted from two lenses. In the laser system such as this, by utilizing the foregoing telescope and by making a laser beam that has been generated in the long-length resonator and that has been contracted to an appropriate size pass through the solid-state laser medium, the stable operation up to a high output has been implemented utilizing the long-length resonator. This constitution, because of using a long-length resonator, provides oscillation with relatively long pulse width.

[Patent reference 1] Japanese Laid-Open Patent Publication 2001-274491 (p. 6-7, FIG. 1)

SUMMARY OF THE INVENTION

In the conventional laser systems, as discussed above, in order to obtain a high output, it is necessary to utilize a short-length resonator and to pump it in high density; whereby the width of the pulse oscillated is likely to be short. In consequence, there has been a problem in that it is difficult to make both contradictory requirements, i.e., a relatively long pulse-width and a high output, meet. In order to cope with this problem, as described above, a constitution for the resonator that utilizes a telescope has been proposed; however, there is a problem in that two or more lenses are required to constitute the telescope, thereby introducing complexity into the system. In particular, when the output is raised by coupling a plurality of solid-state laser media, it is necessary to insert a magnifying and a contracting telescope between respective solid-state laser media, whereby there has been a problem in that complexity and a high cost are introduced into the system. In addition, there has also been a problem in that difficulty is introduced into adjustment.

The present invention has been implemented in order to solve these problems and has an object to obtain a solid-state laser system that provides a high-output, long-pulse-width laser beam, by means of a simple and high-reliability constitution.

A solid-state laser system, according to the present invention, that includes a solid-state laser medium, a light source for pumping the solid-state laser medium, at least two reflecting mirrors for flanking the solid-state laser medium, thereby constituting a laser resonator, is constituted in such a manner that a virtual-mirror plane is defined in the space between the solid-state laser medium and at least one of the reflecting mirrors; at least one optical element is provided between the virtual-mirror plane and the reflecting mirror; and, by means of the forward and backward paths along the route from the virtual-mirror plane to the reflecting mirror by way of the optical element, the virtual-mirror plane in the forward path and the virtual-mirror plane in the backward path are made in an optically conjugated relationship with each other.

Moreover, a solid-state laser system, according to the present invention, that includes a solid-state laser medium, a light source for pumping the solid-state laser medium, at least two reflecting mirrors for flanking the solid-state laser medium, thereby constituting a laser resonator, is constituted in such a manner that a virtual-mirror plane is defined in the space between the solid-state laser medium and at least one of the reflecting mirrors; at least one optical element is provided between the virtual-mirror plane and the reflecting mirror; and, by means of the forward and backward paths along the route from the virtual-mirror plane to the reflecting mirror by way of the optical element, the virtual-mirror plane in the forward path and the virtual-mirror plane in the backward path are made in an optically conjugated relationship with each other.

Still moreover, a solid-state laser system, according to the present invention, that includes a plurality of solid-state laser media, light sources for pumping the plurality of solid-state laser media, at least two reflecting mirrors for flanking the plurality of solid-state laser media, thereby constituting a laser resonator, is constituted in such a manner that two virtual-mirror planes are defined between at least two solid-state laser media out of the plurality of solid-state laser media; and at least one optical element is provided between the two virtual-mirror planes, whereby the two virtual-mirror planes are made to be in an optically conjugated relationship with each other.

A solid-state laser system according to the present invention allows a high-output, long-pulse-width laser beam to be obtained with a simple constitution. In particular, when the output is raised by coupling a plurality of solid-state laser media, the laser system can merely be constituted in such a manner that the solid-state laser media simply be arranged in series; the output of a laser beam that is high-output and long-pulse-width can be obtained with simplified adjustment and high reliability.

DESCRIPTION OF THE PREFERRED EMBODIMENTS

Embodiment 1

Figure 1:
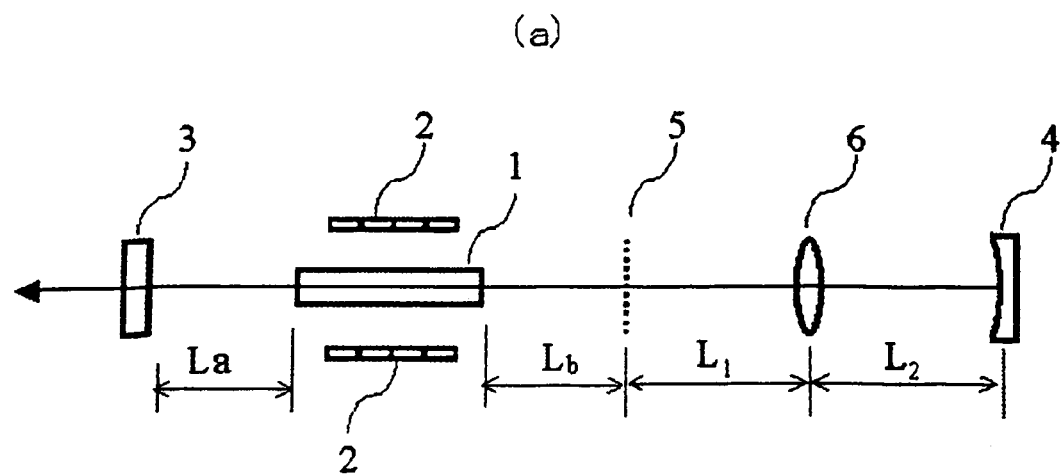
FIG. 1 is a block diagram illustrating a solid-state laser system according to Embodiment 1 of the present invention and a conventional solid-state laser system.
Figure 1:
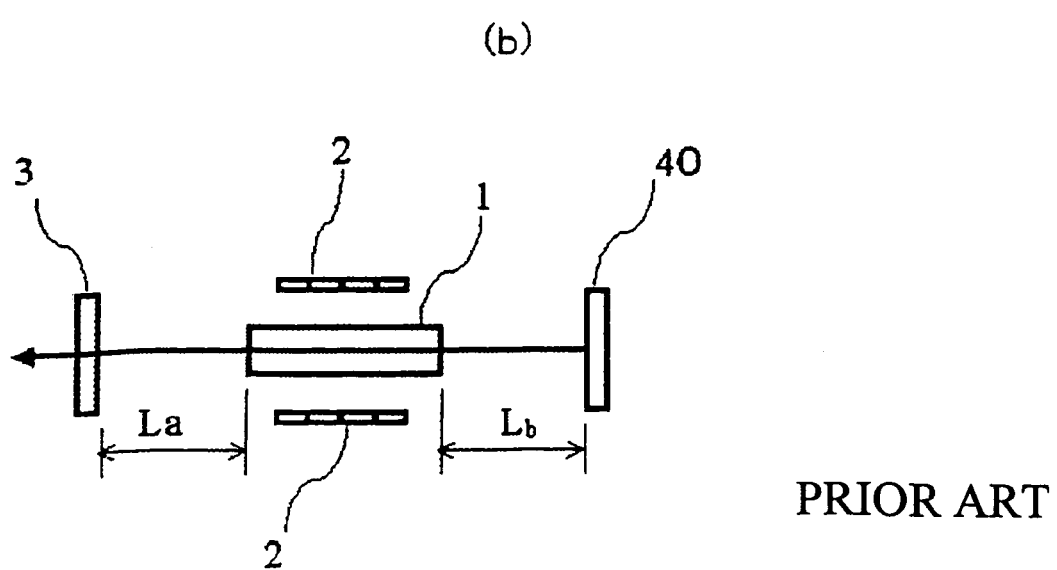

FIG. 1(a) is a block diagram for illustrating a solid-state laser system according to Embodiment 1 of the present invention. The solid-state laser system is constituted from a solid-state laser medium 1, a pumping light source 2 for pumping the solid-state laser medium 1, reflecting mirrors 3 and 4 which constitute resonator mirrors, and a lens 6. In addition, in FIG. 1(a), the reflecting mirror 3 is a partial-reflection mirror, and the reflecting mirror 4 is a totally reflecting mirror. Moreover, a virtual-mirror plane 5 is defined between the solid-state laser medium 1 and at least one reflecting mirror (the totally reflecting mirror 4, in this case). The distance between the solid-state laser medium 1 and the partial-reflection mirror is La, and the distance between the solid-state laser medium 1 and the virtual-mirror plane 5 is Lb; the virtual-mirror plane 5 is defined in the position that corresponds to the position for a totally reflecting mirror 40 (a planar mirror) of a conventional solid-state laser system as illustrated in FIG. 1(b). In FIG. 1(b), the solid-state laser medium 1, the light source 2, and the partial-reflection mirror 3 are identical to the solid-state laser medium 1, the light source 2, and the partial-reflection mirror 3, respectively, in FIG. 1(a). The lens 6 is provided in the position having a distance of L1 from the virtual-mirror plane 5, and the reflecting mirror 4 is provided in the position having a distance of L2 from the lens 6. L1 and L2 will be described later.

Next, the operation of the solid-state laser system illustrated in FIG. 1, according to Embodiment 1, will be discussed.

The solid-state laser medium 1 is pumped by the pumping light source 2 to have gain. A ray that shuttles between the partial-reflection mirror 3 and the totally reflecting mirror 4 is amplified by means of the gain of the laser medium 1 and then is extracted as an output from the partial-reflection mirror 3. Letting the distance between the virtual-mirror plane 5 and the lens 6 be L1, the distance between the lens 6 and the totally reflecting mirror 4 be L2, the curvature of the totally reflecting mirror 4 be R, and the focal length of the lens 6 be f, then the ray matrix is given by Equation (1) in which the back-and-forth paths along the route from the virtual-mirror plane 5 to the totally reflecting mirror 4 by way of the lens 6 are rendered.

$$\begin{bmatrix} A & B \\ C & D \end{bmatrix} = \begin{bmatrix} 1 & L_1 \\ 0 & 1 \end{bmatrix} \cdot \begin{bmatrix} 1 & 0 \\ -1/f & 1 \end{bmatrix} \cdot \begin{bmatrix} 1 & L_2 \\ 0 & 1 \end{bmatrix} . \quad (1)$$

$$\begin{bmatrix} 1 & 0 \\ -2/R & 1 \end{bmatrix} \cdot \begin{bmatrix} 1 & L_2 \\ 0 & 1 \end{bmatrix} \cdot \begin{bmatrix} 1 & 0 \\ -1/f & 1 \end{bmatrix} \cdot \begin{bmatrix} 1 & L_1 \\ 0 & 1 \end{bmatrix}$$

In this situation, for example, given that L1=2f, L2=2f, and R=f, Equation (1) is replaced by Equation (2); the ray matrix by Equation (2) is identical to that for expressing the ray matrix for a planar mirror.

$$\begin{bmatrix} A & B \\ C & D \end{bmatrix} = \begin{bmatrix} 1 & 0 \\ 0 & 1 \end{bmatrix} \quad (2)$$

This indicates that the optical effect of traveling back and forth along the route from the virtual-mirror plane 5 to the totally reflecting mirror 4 by way of the lens 6 is equivalent to the optical effect in the case where the planar mirror is situated in the position for the virtual-mirror plane 5. In consequence, in the constitution in FIG. 1(a), when L1=2f, L2=2f, and R=f, the laser resonator demonstrates the same operation as that of a resonator in which the planar mirror is situated in the position for the virtual-mirror plane 5, i.e., the resonator constituted as in FIG. 1(b).

Figure 2:
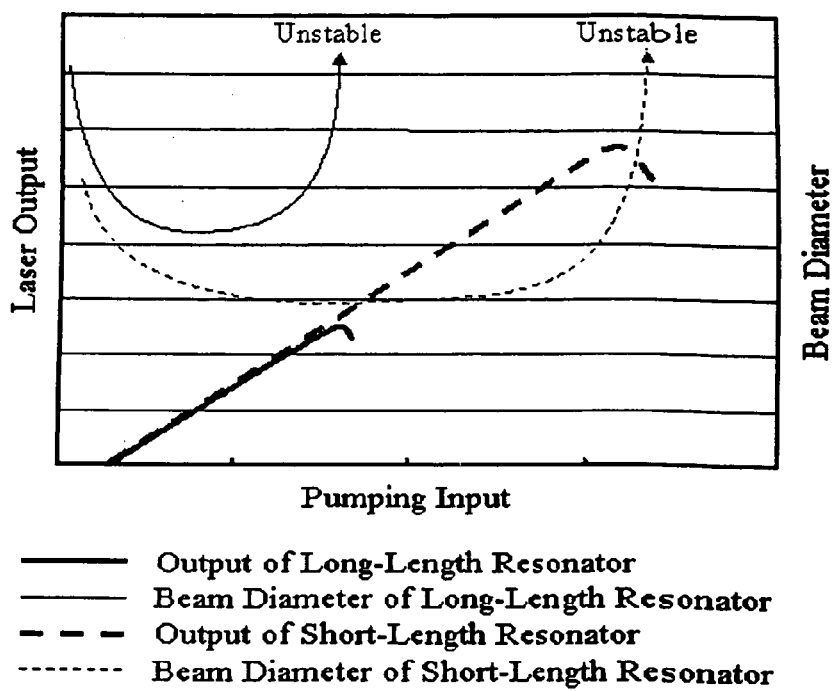
FIG. 2 is a set of graphs for explaining the operation of the conventional solid-state laser system.
Figure 2:
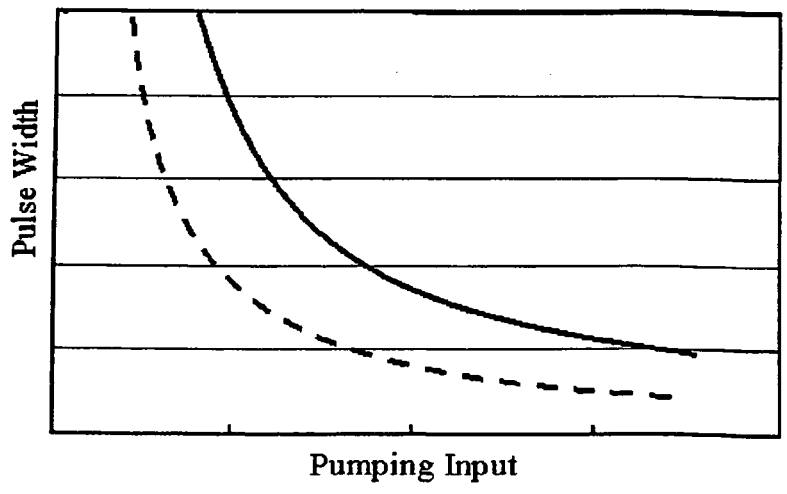
Figure 3:
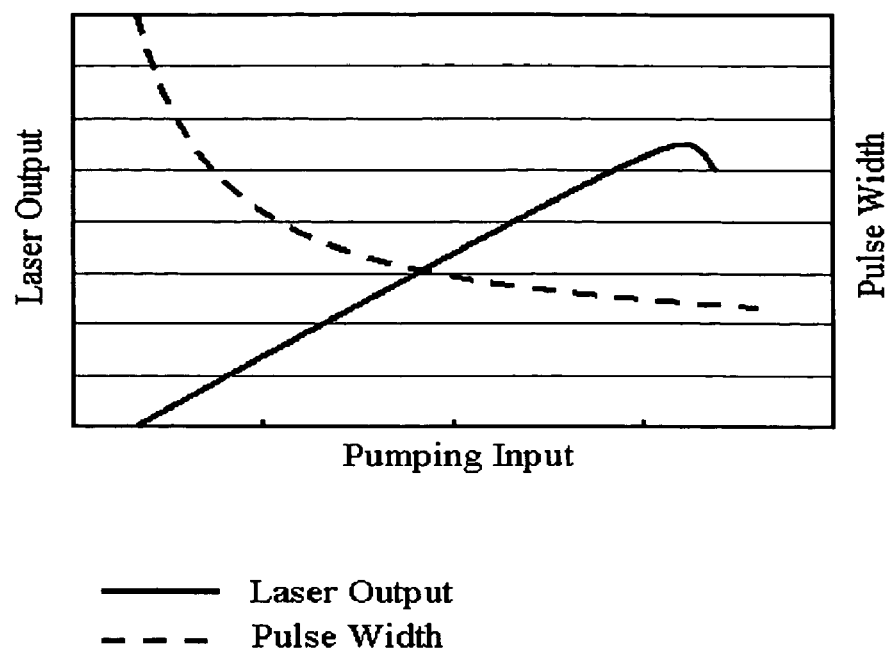
FIG. 3 is a set of graphs representing the operation of a solid-state laser system according to Embodiment 1 of the present invention in comparison to that of the conventional solid-state laser system.
Figure 3:
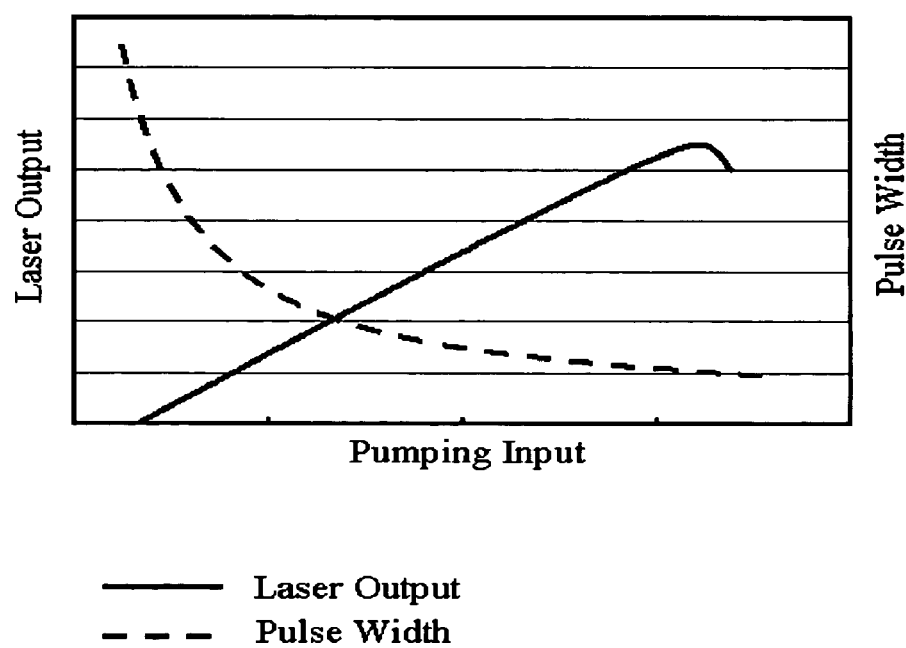

FIG. 2 represents the operational properties of a conventional solid-state laser system. FIG. 3 is a set of graphs representing the operational properties of the solid-state laser system according to Embodiment 1 in comparison to those of a conventional solid-state laser system; FIG. 3(a)

and FIG. 3(b) represent the operational properties of the resonator in the case where L1=2f, L2=2f, and R=f, in the constitution in FIG. 1(a), and the operational properties of the resonator of the conventional solid-state laser system illustrated in FIG. 1(b), respectively.

In the conventional solid-state laser system, as represented in FIG. 2(a), the output of the resonator increases approximately in proportion to the pumping input; however, when the pumping input exceeds a predetermined value, a phenomenon is caused in which the operation of the resonator becomes unstable and the oscillation ceases. In addition, the limit of the pumping input under which the resonator stably operates is related to the length of the resonator; as represented in FIG. 2(a), it is understandable that the shorter the length of the resonator is, the higher pumping input and the higher output the resonator stably operates for. Moreover, as represented in FIG. 2(b), it is understandable that, in the conventional solid-state laser system, the shorter the length of the resonator is and the stronger the pumping is, the shorter the pulse width is.

In contrast, in the solid-state laser system according to Embodiment 1, as described above, the laser resonator demonstrates the operation equivalent to that in the case where the planar mirror is situated in the position for the virtual-mirror plane 5; the inner-resonator beam diameter in the laser medium section is the same as that of the conventional solid-state laser system; and the operational properties, of the solid-state laser system, that are entirely identical to those of the conventional solid-state laser system, in terms of the area of safety operation and the laser output, can be obtained. In other words, as will be seen in FIGS. 3(a) and 3(b), the relationship between the pumping input and the laser output is approximately the same as that of the conventional solid-state laser system. Meanwhile, in the constitution in FIG. 1(a), because the length of the resonator is long as compared to that of the conventional resonator, the time for a laser ray to shuttle through the resonator is longer; whereby oscillation properties accompanied by long pulse width is obtained in pulse operation. In other words, FIGS. 3(a) and 3(b) do not share the same relationship between the pumping input and the pulse width, and the present invention described in Embodiment 1 represented in FIG. 3(a) provides a laser beam having long pulse width as compared to the conventional system, for the same pumping input.

The above operation can be understood by considering in the following manner; i.e., it can be understood that a space between optically conjugate planes, i.e., a propagation space for a laser ray that passes through the conjugate plane and returns to that conjugate plane, is an optically short-circuited space in terms of the operation of the resonator, and the space does not affect the operation of the resonator; however, in the process of amplifying the laser ray, the space causes a time delay corresponding to spatial propagation. The constitution in FIG. 1(a) utilizes these operational properties to allow both the high-output operation, and the long-pulse-width oscillation, of the resonator, to be met.

In the above embodiment, as an example, the conditions, i.e., L1=2f, L2=2f, R=f were employed; however, more in general, the conditions, for L1 and L2, for making a virtual planar mirror appear in the position for the virtual-mirror plane 5, by utilizing a single lens 6, is given by Equations (3) and (4) below. On condition that reflecting mirrors and a lens, which are commonly available, are combined and arranged in such a manner as to meet the conditions given by Equations (3) and (4), provision is made for design whose degree of freedom is higher in terms of the operational properties.

$$L_1 = \frac{f(f+R)}{R} \quad (3)$$

$$L_2 = f + R \quad (4)$$

In addition, in the above embodiment, the case was discussed where a virtual planar mirror is made to appear in the position for the virtual-mirror plane 5; however, it is possible to make a virtual mirror having an arbitrary curvature appear.

For example, letting L1 and L2 be 2f, then Equation (1) is replaced by Equation (5);

$$\begin{bmatrix} A & B \\ C & D \end{bmatrix} = \begin{bmatrix} 1 & 0 \\ \frac{2}{f} - \frac{2}{R} & 1 \end{bmatrix} \quad (5)$$

Equation (5) indicates that the operation, of the resonator, is obtained that is identical to that in the case where a curved-surface mirror having a curvature R* given below is provided at the virtual-mirror plane.

$$R^* = \frac{fR}{R-f}$$

Moreover, in the above embodiment, the case was discussed where the virtual-mirror plane 5 is in an optically conjugated relationship with a reflecting mirror; however, the resonator may be constituted in such a manner that the virtual-mirror plane in the outgoing path is optically conjugated to the virtual-mirror plane in the return path, by means of the back-and-forth paths along the route from the virtual-mirror plane 5 to the totally reflecting mirror 4 by way of the lens 6. Typical examples include the case where L1=L2=f, and R=∞ (a planar mirror).

In addition, in the above embodiment, the arrangement for each constituent element of the resonator was discussed in the case where the virtual-mirror plane 5 is provided at the side of the totally reflecting mirror with respect to the laser medium provided within the resonator; however, it goes without saying that the same effect can be obtained even when the virtual-mirror plane 5 is provided at the side of the partial-reflection mirror (an extracting mirror) or two virtual-mirror planes are provided flanking the laser medium.

Moreover, in the above embodiment, the case was discussed in which the resonator has the most simple constitution with one lens 6; however, it goes without saying that the resonator can be implemented demonstrating the same effect, even when a plurality of lenses is employed.

Figure 4:
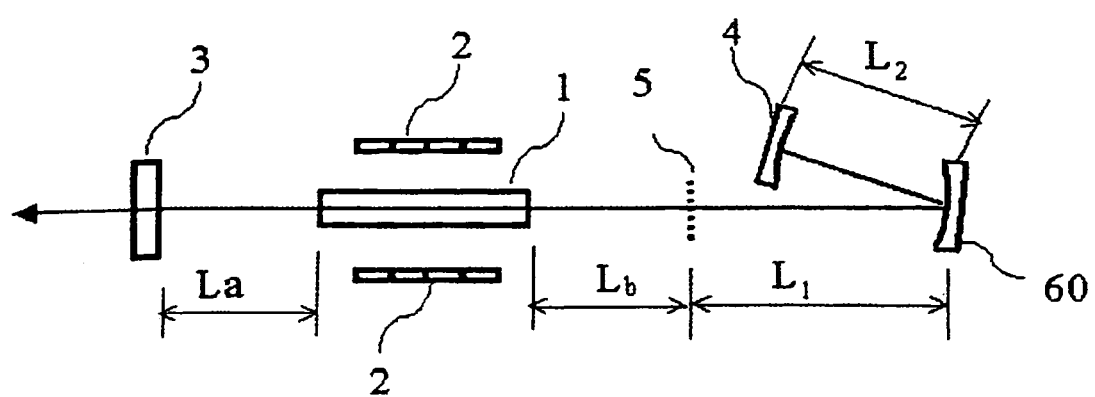
FIG. 4 is a block diagram illustrating another solid-state laser system according to Embodiment 1 of the present invention.

Still moreover, in the above embodiment, an example in which the lens 6 is used was shown; however, as illustrated in FIG. 4, a reflection-type condensing element 60 may be employed in place of the lens 6. Employing the reflection-type condensing element 60 provides a return-type, compact constitution. If the incident angle to the reflection-type condensing element is large, a spheroidal surface or a paraboloidal surface may be utilized.

Embodiment 2

A solid-state laser system is made to be high-output, by coupling in series a plurality of fundamental units that each include a solid-state laser medium. In the foregoing conventional solid-state laser systems, as a constitution, for the resonator, that makes both a relatively long pulse width and high output be satisfied, it has been described that there is the constitution for the resonator in which the telescopes 7 are utilized; however, in such a constitution, in order to make the resonator be high-output by utilizing a plurality of solid-state laser media, it is necessary to insert between the respective solid-state laser media a magnifying telescope and a contracting telescope; whereby there has been a problem in that complexity and high cost are introduced into the system. In addition, there has been a problem in that difficulty is introduced into adjustment.

In contrast, in the case of the solid-state laser system according to Embodiment 1, the simple constitution provides a high-output, long-pulse-width laser beam.

Figure 5:
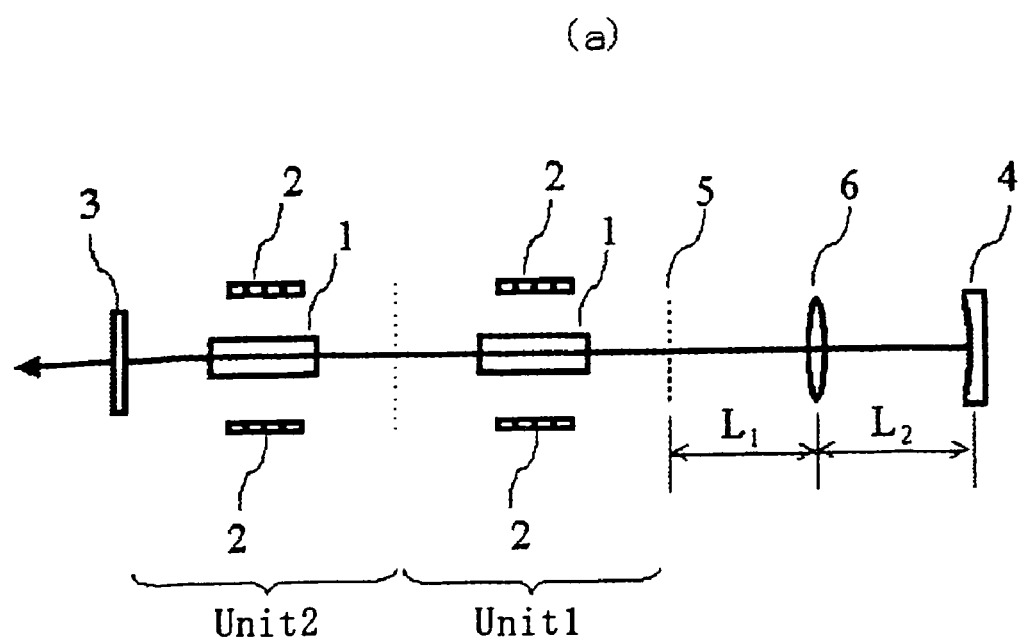
FIG. 5 is a set of block diagrams illustrating a solid-state laser system according to Embodiment 2 of the present invention and a conventional solid-state laser system with telescopes.
Figure 5:
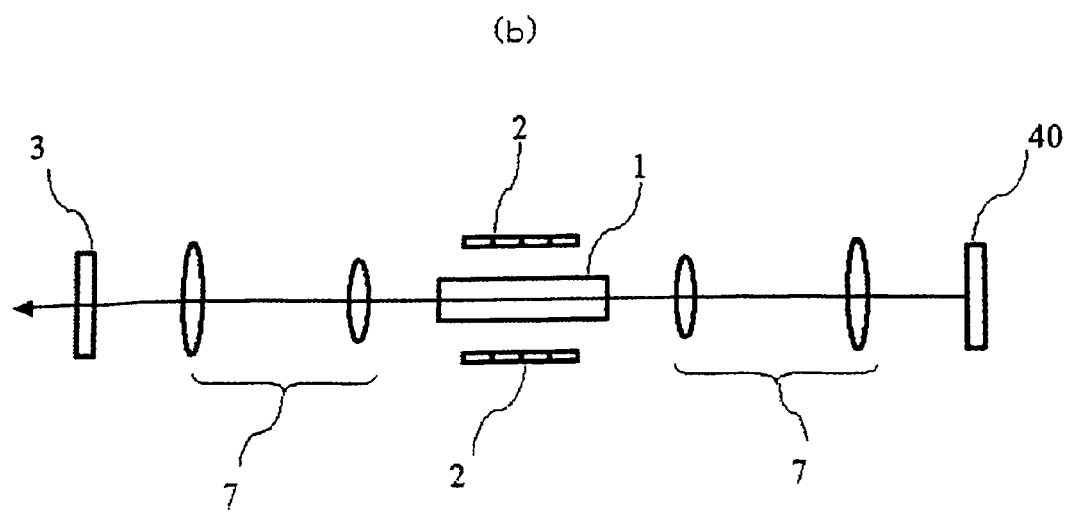

FIG. 5(a) is a block diagram for illustrating a solid-state laser system according to Embodiment 2 of the present invention; a case is shown where two solid-state laser media 1 are coupled.

In FIG. 5(a), each of a plurality of solid-state laser media 1 is pumped by the pumping light source 2 to have gain. A ray that shuttles between the partial-reflection mirror 3 and the totally reflecting mirror 4 is amplified by means of the gain of the laser medium 1 and then is extracted as an output from the partial-reflection mirror 3. In this situation, as is the case with Embodiment 1, by defining the virtual-mirror plane 5 between the solid-state laser medium 1 and at least one resonator mirror (the totally reflecting mirror 4, in this case), by providing the lens 6 between the virtual-mirror plane 5 and the totally reflecting mirror 4, and by defining the positions of the virtual-mirror plane 5 and the lens 6 in the positions that are determined by L1 and L2, as described in Embodiment 1, in the back-and-forth paths along the route from the virtual-mirror plane 5 to the totally reflecting mirror 4 by way of the lens 6, the constitution is achieved in which the virtual-mirror plane in the outgoing path is conjugated to the virtual-mirror plane in the return path; whereby a laser-beam output that is high-output and has a relatively long pulse-width can be obtained. In addition, owing to the constitution in which a plurality of solid-state laser media is coupled, higher-output laser beams can be obtained.

Moreover, in coupling a plurality of units 1 and 2, if the units are arranged in such a manner that the wave surface of a laser beam that propagates undergoing a thermal-lens action by the solid-state laser medium 1 is planar at the both ends of each of the fundamental units, the simple arrangement of the plurality of units having the same specification provides periodic beam propagation; therefore, simple and efficient coupling can be achieved. For example, in FIG. 5(a), if the system is constituted in such a manner that a virtual planar mirror is made to appear in the position for the virtual-mirror plane 5 (e.g., L1=2f, L2=2f, and R=f), the wave surface of the laser beam is planar at the both ends of each of the fundamental units. In consequence, by simply arranging the plurality of the units without any additional means for wave-surface matching in coupling the fundamental units, provision is readily made for the system to be high-output.

In FIG. 5(a), the example was shown in which two units are coupled; however, it goes without saying that an arbitrary number of units can be coupled without utilizing additional means.

Moreover, in the foregoing Embodiment 2, the case was discussed where the virtual-mirror plane 5 is defined between the totally reflecting mirror and the solid-state laser medium, among the plurality of solid-state laser media, that is placed at the side of the totally reflecting mirror; however, the virtual-mirror plane 5 may be defined between the partially reflecting mirror (an extracting mirror) and the solid-state laser medium at the side of the partially reflecting mirror or may be in both of that positions described above.

Figure 6:
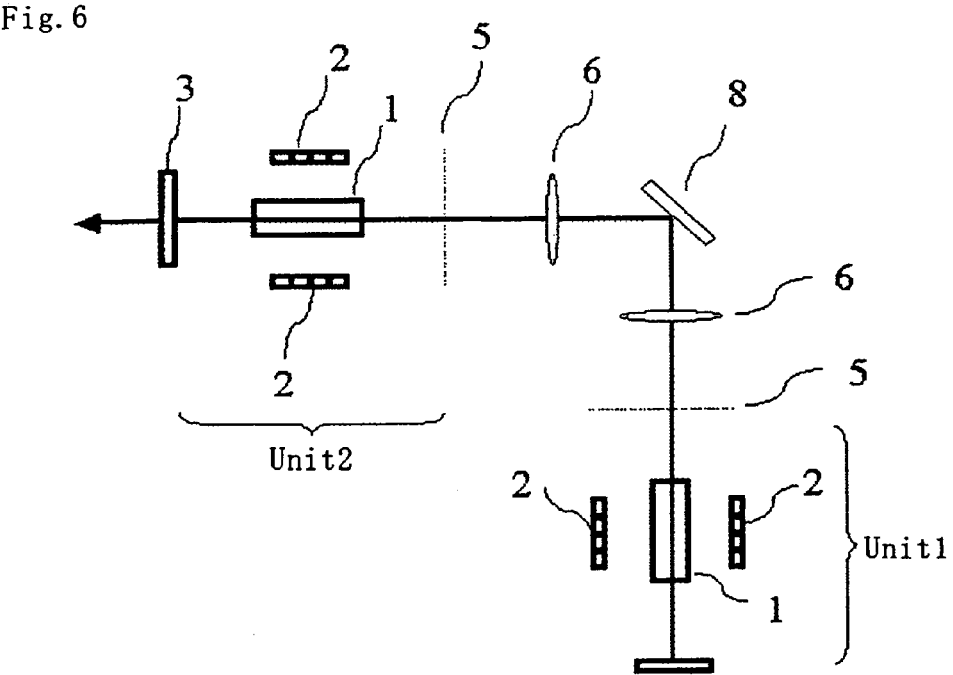
FIG. 6 is a block diagram illustrating another solid-state laser system according to Embodiment 2 of the present invention.

Furthermore, owing to the operational principle that a space between optically conjugate planes, as an optically short-circuited space in terms of the operation of the resonator, does not affect the operation of the resonator, but causes a time delay corresponding to spatial propagation in the process of amplifying the laser ray, in the case where a plurality of solid-state laser media is employed, the optically short-circuited spaces may be provided between adjacent media among the plurality of the solid-state laser media. FIG. 6 is a block diagram illustrating a solid-state laser system constituted in this fashion; by defining two virtual-mirror planes 5 between the unit 1 and the unit 2, by providing two lenses 6 and the totally reflecting mirror 8 between the two virtual-mirror planes 5, and by defining in a predetermined manner the positions of the lenses and the totally reflecting mirror, and the focal length of the lens, etc., as is the case with Embodiment 1, the system is constituted in such a manner that the two virtual-mirror planes 5 are in an optically conjugated relationship with each other. In cases where there is no sufficient space to install the laser units, this constitution has an advantage of providing an enhanced degree of freedom in constituting the system when the system is installed.

Moreover, in FIG. 6, two lenses 6 and the totally reflecting mirror 8 are provided between the two virtual-mirror planes 5; however, as illustrated in FIG. 4, the system may be constituted in such a manner that the lenses 6 are replaced, for example, by reflection-type condensing elements, and the two virtual-mirror planes 5 are in a conjugated relationship with each other.

Embodiment 3

An amplifier is employed as a means for making a solid-state laser system be higher-output.

Figure 7:
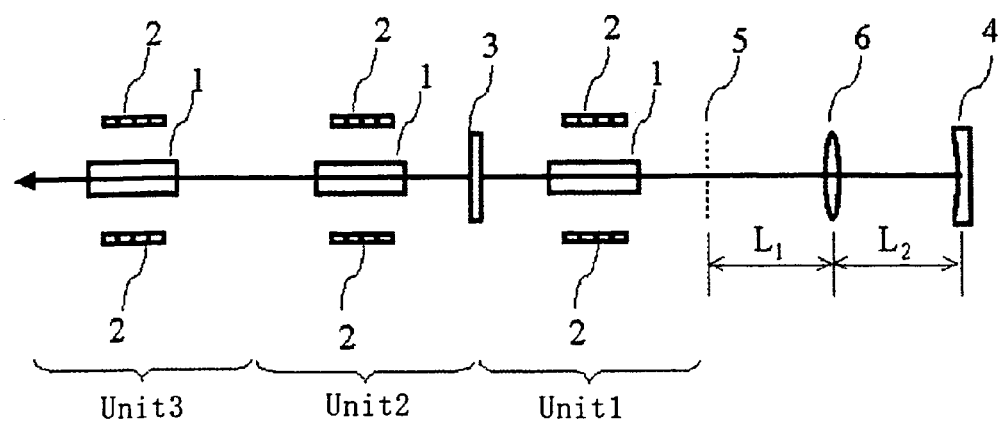
FIG. 7 is a block diagram illustrating a solid-state laser system according to Embodiment 3 of the present invention.

FIG. 7 is a block diagram for illustrating a solid-state laser system according to Embodiment 3 of the present invention; a constitution is shown in which amplifiers are employed. In FIG. 7, the unit 1 is an oscillator stage, and the units 2 and 3 constitute an amplifier stage.

In FIG. 7, the solid-state laser medium 1 in respective units is pumped by the pumping light source 2 to have gain. A ray that shuttles between the resonator mirrors 3 and 4 is amplified by means of the gain of the laser medium 1 in the unit 1 and then is extracted as an oscillating beam from the partial-reflection mirror 3. Amplification of this oscillating beam by transmitting it through the amplifier stage constituted from the units 2 and 3 readily provides a high-output laser beam. In addition, in Embodiment 3, by providing the virtual-mirror plane 5 and the lens 6 within the resonator and by setting them in the positions described in Embodiment 1, provision is made for a high-output, relatively long-pulse-width pulse laser beam to be obtained. Moreover, in Embodiment 3, providing the amplifier stages outside the resonator facilitates the adjustment.

In particular, if the system is constituted in such a manner that a virtual planar mirror is made to appear in the position for the virtual-mirror plane (e.g., L1=2f, L2=2f, and R=f), provision is made for the system to be made high-output without any correcting optical element, by utilizing the same fundamental units.

Moreover, in the foregoing embodiment, the case was shown where one solid-state laser medium is provided within the resonator; however, as is the case with Embodiment 2, a plurality of solid-state laser media may be provided.

Still moreover, the positions for the virtual-mirror plane, the lens, and the reflecting mirror may also be arranged in a different way that meet the conditions described in Embodiments 1 and 2.

Furthermore, in the above embodiment, the example in which the lens 6 is used has been shown; however, other optical elements, e.g., a reflection-type condensing element illustrated in FIG. 4, may be employed.

What is claimed is:

1. A solid-state laser system, comprising: a first pumping laser unit including a first solid-state laser medium and a first light source configured to pump the first solid-state laser medium to emit a light beam from a first and a second end of the first solid-state laser medium;
    a totally reflecting mirror positioned on an optical path at a first predetermined optical distance from the first end of the first solid-state laser medium to receive the light beam;
    a partially reflecting mirror positioned on the optical path at a second predetermined optical distance from the second end of the first solid-state laser medium to receive the light beam;
    an optical element positioned on the optical path between the totally reflecting mirror and the first end of the first solid-state laser medium at a third predetermined optical distance from the first end of the first solid-state laser medium; and a second pumping laser unit positioned on the optical path between the partially reflecting mirror and the second end of the first solid-state laser medium and including a second solid-state laser medium and a second light source configured to pump the second solid-state laser medium to emit a light beam from a first and a second end of the second solid-state laser medium, the first end of the second pumping laser unit facing the second end of the first pumping laser unit, wherein the first and second pumping laser units are positioned so there is a point halfway between the second end of the first solid-state laser unit and the first end of the second solid-state laser unit designated as a centerpoint, and the first and third predetermined optical distances are established to cause a light beam traveling to the totally reflecting mirror to be optically conjugated with a light beam traveling from the totally reflecting mirror at a position between the optical element and the first end of the first solid-state laser medium, the position being located at a distance from the centerpoint equal to a distance between the centerpoint and the partially reflecting mirror and being defined as a virtual mirror position; and
    wherein the optical element has a focal length of f, a curvature of the totally reflecting mirror is R, a distance between the virtual-mirror position and the optical element is L1, and a distance between the optical element and the totally reflecting mirror is L2, such that: L1=f(f+R)/R, and L2=f+R.

2. The solid-state laser system according to claim 1, wherein the optical element is one of a lens and a reflective type condensing element.

3. The solid-state laser system according to claim 1, further comprising:
    a third pumping laser unit located between the first and second pumping laser units, a center position of the third pumping laser unit located at said centerpoint.

4. A solid-state laser system, comprising: a pumping laser unit including a solid-state laser medium and a light source configured to pump the solid-state laser medium to emit a light beam from a first and a second end of the solid-state laser medium;
    a totally reflecting mirror positioned on an optical path at a first predetermined optical distance from the first end of the solid-state laser medium to receive the light beam;
    a partially reflecting mirror positioned on the optical path at a second predetermined optical distance from the second end of the solid-state laser medium to receive the light beam;
    an optical element positioned on the optical path between the totally reflecting mirror and the first end of the solid-state laser medium at a third predetermined optical distance from the first end of the solid-state laser medium; and at least one additional pumping laser unit, wherein the partially reflecting mirror is positioned on the optical path between the second end of the solid-state laser medium and the at least one additional pumping laser unit, and the first and third predetermined optical distances are established to cause a light beam traveling to the totally reflecting mirror to be optically conjugated with a light beam traveling from the totally reflecting mirror at a position between the optical element and the first end of the solid-state laser medium, the position being located at a distance from a centerpoint of the solid-state laser medium equal to a distance between the centerpoint and the partially reflecting mirror and being defined as a virtual mirror position; and wherein the optical element has a focal length of f, a curvature of the totally reflecting mirror is R, a distance between the virtual-mirror position and the optical element is L1, and a distance between the optical element and the totally reflecting mirror is L2, such that: L1=f(f+R)/R, and L2=f+R.

5. The solid-state laser system according to claim 4, wherein the optical element is one of a lens and a reflective type condensing element.

6. A solid-state laser system, comprising;
    a first pumping laser unit including a first solid-state laser medium and a first light source configured to pump the first solid-state laser medium to emit a first light beam from a first and a second end of the first solid-state laser medium;
    a first totally reflecting mirror positioned on an optical path at a first predetermined optical distance from the first end of the first solid-state laser medium to receive the first light beam;
    a partially reflecting mirror positioned on an optical path at a second predetermined optical distance from the second end of the first solid-state laser medium to receive the light beam;
    a first optical element positioned on the optical path between the first totally reflecting mirror and the first end of the first solid-state laser medium at a third predetermined optical distance from the first end of the first solid-state laser medium;

a second pumping laser unit including a second solid-state laser medium and a second light source configured to pump the second solid-state laser medium to emit a second light beam from a first and a second end of the second solid-state laser medium, the first end of the solid-state laser medium positioned on an optical path at a fourth predetermined optical distance from the first totally reflecting mirror;

a second totally reflecting mirror positioned on the optical path at a fifth predetermined optical distance from the second end of the second solid-state laser medium to receive the second light beam; and a second optical element positioned on the optical path between the first totally reflecting mirror and the first end of the second solid-state laser medium at a sixth predetermined optical distance from the first end of the second solid-state laser medium, wherein the first, third, fourth and sixth predetermined optical distances are established to cause light traveling toward the first laser unit at a first position between the first optical element and the first end of the first solid-state laser medium to be optically conjugated with light traveling toward the first laser unit at a second position between the second optical element and the first end of the second solid-state laser medium, and light traveling toward the second laser unit at the first position between the first optical element and the first end of the first solid-state laser medium to be optically conjugated with light traveling toward the second laser unit at the second position between the second optical element and the first end of the second solid-state laser medium.

7. A solid-state laser system, comprising;

a first pumping laser unit including a first solid-state laser medium and a first light source configured to pump the first solid-state laser medium to emit a first light beam from a first and a second end of the first solid-state laser medium;

a second pumping laser unit including a second solid-state laser medium and a second light source configured to pump the second solid-state laser medium to emit a second light beam from a first and a second end of the second solid-state laser medium;

a partially reflecting mirror positioned on an optical path at a first predetermined optical distance from the second end of the first solid-state laser medium to receive the first light beam;

a first optical element positioned on the optical path at a second predetermined optical distance from the first end of the first solid-state laser medium to receive the first light beam;

a second optical element positioned on the optical path at a third predetermined optical distance from the first end of the second solid-state laser medium, the second optical element positioned on the optical path at a fourth predetermined optical distance from the first optical element; and a totally reflecting mirror positioned on the optical path at a fifth predetermined optical distance from the second end of the second solid-state laser medium to receive the second light beam, wherein the second, third and fourth predetermined optical distances are established to cause light traveling toward the first laser unit at a first position between the first optical element and the first end of the first solid-state laser medium to be optically conjugated with light traveling toward the first laser unit at a second position between the second optical element and the first end of the second solid-state laser medium, and light traveling toward the second laser unit at the first position between the first optical element and the first end of the first solid-state laser medium to be optically conjugated with light traveling toward the second laser unit at the second position between the second optical element and the first end of the second solid-state laser medium.

8. A solid-state laser system, comprising;

a first pumping laser unit including a first solid-state laser medium and a first light source configured to pump the first solid-state laser medium to emit a first light beam from a first and a second end of the first solid-state laser medium;

a reflective type condensing element positioned on an optical path at a first predetermined optical distance from the first end of the first solid-state laser medium to receive the first light beam;

a partially reflecting mirror positioned on the optical path at a second predetermined optical distance from the second end of the first solid-state laser medium to receive the first light beam;

a second pumping laser unit including a second solid-state laser medium and a second light source configured to pump the second solid-state laser medium to emit a second light beam from a first and a second end of the second solid-state laser medium, the first end of the solid-state laser medium positioned on an optical path at a third predetermined optical distance from the reflective type condensing element; and a totally reflecting mirror positioned on an optical path at a fourth predetermined optical distance from the second end of the second solid-state laser medium to receive the second light beam, wherein the first and third predetermined optical distances are established to cause light traveling toward the first laser unit at a first position between the first optical element and the first end of the first solid-state laser medium to be optically conjugated with light traveling toward the first laser unit at a second position between the second optical element and the first end of the second solid-state laser medium, and light traveling toward the second laser unit at the first position between the first optical element and the first end of the first solid-state laser medium to be optically conjugated with light traveling toward the second laser unit at the second position between the second optical element and the first end of the second solid-state laser medium.

* * * * *